(12) United States Patent
Chow et al.

(10) Patent No.: US 7,445,334 B2
(45) Date of Patent: Nov. 4, 2008

(54) LENSES

(75) Inventors: David Tak Fung Chow, Kowloon Bay (HK); Ngai Shing Chan, Kowloon Bay (HK)

(73) Assignee: Easy Power Limited, Kowloon Bay (HK)

( * ) Notice: Subject to any disclaimer, the term of this patent is extended or adjusted under 35 U.S.C. 154(b) by 54 days.

(21) Appl. No.: 11/050,331

(22) Filed: Feb. 2, 2005

(65) Prior Publication Data
US 2005/0168686 A1 Aug. 4, 2005

(30) Foreign Application Priority Data
Feb. 3, 2004 (GB) ................... 0402332.1

(51) Int. Cl.
*G02C 7/02* (2006.01)
*G02C 7/10* (2006.01)

(52) U.S. Cl. .............. 351/177; 351/159; 351/163; 351/174

(58) Field of Classification Search ........... 351/159, 351/163–165, 166, 174, 177
See application file for complete search history.

(56) References Cited

U.S. PATENT DOCUMENTS

| 3,716,489 | A | * | 2/1973 | DeLapp ............... 252/586 |
| 5,135,298 | A | * | 8/1992 | Feltman ............... 351/163 |
| 5,327,180 | A | * | 7/1994 | Hester et al. ............ 351/165 |
| 6,079,827 | A | * | 6/2000 | Coleman et al. .......... 351/177 |
| 2002/0034642 | A1 | | 3/2002 | Takahashi et al. |
| 2002/0196408 | A1 | | 12/2002 | Bhalakia et al. |

FOREIGN PATENT DOCUMENTS

| FR | 2284574 | 9/1975 |
| JP | 9509749 T | 9/1997 |
| JP | 11061081 A | 3/1999 |
| WO | WO 01/23954 A | 4/2001 |

* cited by examiner

*Primary Examiner*—Scott J Sugarman
(74) *Attorney, Agent, or Firm*—Intellectual Property Law Group LLP; Otto O. Lee; Juneko Jackson

(57) ABSTRACT

A method of sealing lenses includes the steps of grinding the edges of at least two lenses, cleansing the lenses, positioning the lenses next to one another, applying an adhesive to the ground edges of the lenses and placing the lenses in an oven to cure the adhesive to produce a laminated, hermetically-sealed, lens.

20 Claims, 3 Drawing Sheets

LENSES

FIELD OF THE INVENTION

This invention relates to improvements in lenses and is particularly concerned with improved techniques for sealing lenses.

BACKGROUND OF THE INVENTION

It has previously been proposed to apply silicon into frame grooves to function as a cushion to the lens edge to prevent delamination. This did not prove to be satisfactory. The application of thin adhesive tape at the lens edge also failed to achieve good results. Various other methods have been tried including the application of silicon, paint and nickel but all have failed to prevent de-lamination of lenses.

SUMMARY OF THE INVENTION

The present invention seeks to provide a reliable method of sealing lenses which ensures that de-lamination does not take place.

According to the invention, there is provided a method of sealing lenses which includes the steps of grinding the edges of at least two lenses, cleansing the lenses, positioning the lenses next to one another, applying an adhesive to the ground edges of the lenses and placing the lenses in an oven to cure the adhesive to produce a laminated, hermetically-sealed, lens.

A polarizing film may be applied between the lenses.

The lenses are preferably ground to have beveled edges.

Further, the lenses are preferably cleansed by being placed in a basket and then subjected to ultra-sonic cleansing.

The adhesive is desirably cured in an oven between 40° C. and 50° C. for about 4 hours.

Preferably, the adhesive comprises a principal ingredient including at least one of bisphenol A, epoxy resin and butyl ether; a first solidifier including at least one of polyoxy propylene diamine and triethanolamine and a second solidifier including at least one of diethylamine and propylamine.

BRIEF DESCRIPTION OF THE DRAWINGS

The invention will now be described in detail, by way of example, with reference to the drawings, in which.

In the drawings, like parts are denoted by like reference numerals.

DETAILED DESCRIPTION OF SPECIFIC EMBODIMENTS

Figure 1:
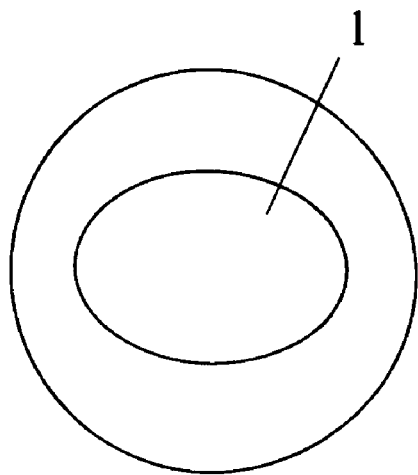
FIG. 1 shows an uncut lens.
Figure 2:
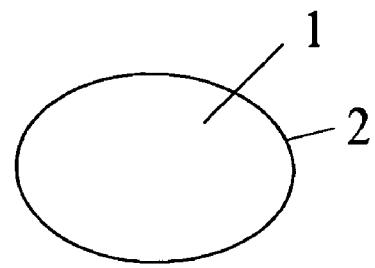
FIG. 2 shows a lens after the edge has been cut and ground.
Figure 3:
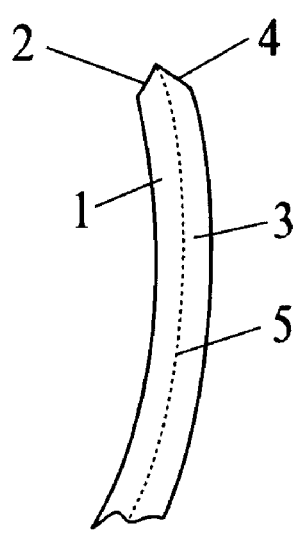
FIG. 3 is a side view of parts of a pair of lenses which have been fitted together.

Referring to the drawings, as shown in FIG. 1, a lens 1 is cut from a sheet of glass or CR39 laminated polarising material. The edge of the lens is then subjected to grinding to form a bevelled edge 2 as shown in FIG. 2. After cleansing, the lens is then fitted to a similar lens 3 having a beveled edge 4 the sized of the lenses 1 and being such that their bevelled edges 2 and 4 are substantially coterminous. As shown in FIG. 3, the bevelled edges 2 and 4 slope away from each other so that they meet at a point. A polarising film 5 may be applied between the lenses 1 and 3, again as shown in FIG 3.

Figure 4:
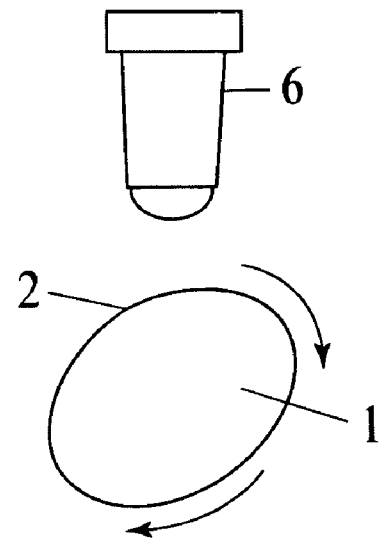
FIG. 4 shows the application of an adhesive to the fitted lenses.
Figure 5:
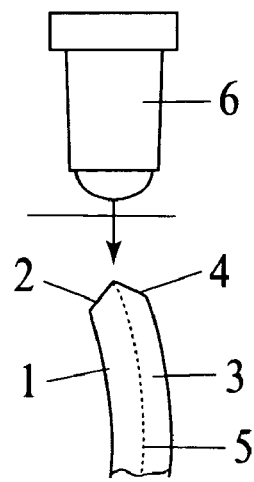
FIG. 5 is a side view of parts of the lenses shown in FIG. 4 showing the application of the adhesive.
Figure 6:
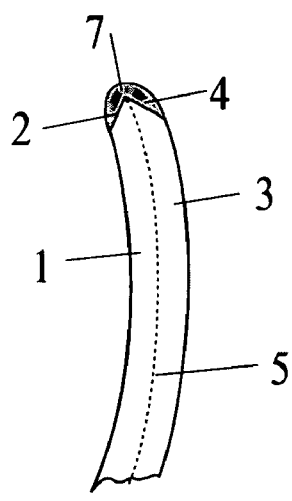
FIG. 6 is a side view, corresponding to FIG. 5, showing the adhesive applied to the edge of the lenses.

The lenses 1 and 3 are then brought to an applicator 6 containing an adhesive of a suitable formulation and the lenses are rotated so that the adhesive is applied evenly to the ground edges 2 and 4 of the lenses. FIGS. 4 and 5 show the application of the adhesive to the edges of the lenses and FIG. 6 shows a bead 7 of adhesive applied to the said edges.

Figure 7:
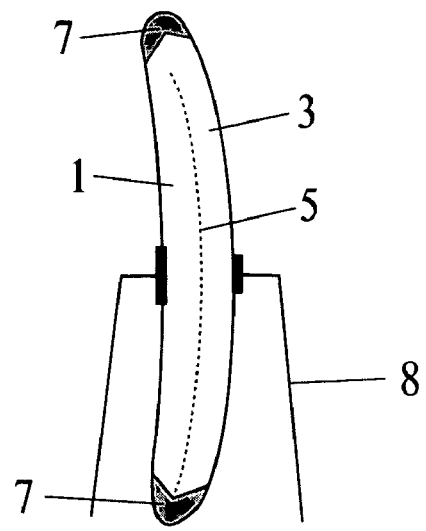
FIG. 7 shows the lenses., to which the adhesive has been applied, mounted in a mount for curing.
Figure 8:
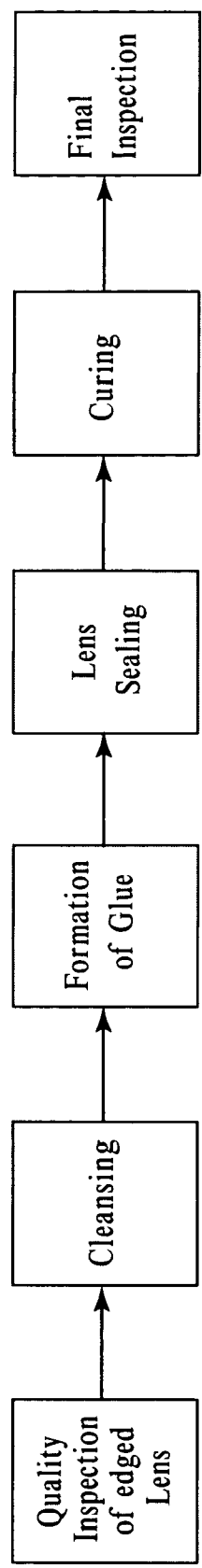
FIG. 8 shows a work process flow chart.

The lenses are then placed in a mount 8, as shown in FIG. 7, and put in an oven to cure the adhesive. Once the adhesive has cured, the lenses are subjected to a final inspection. FIG. 8 is a flow chart showing the various stages of production of a laminated lens according to the invention.

Sealing of the lenses should be carried out in a dust-free clean room of cleaning level 10,000 or above with the temperature controlled to be between 20° C. and 25° C. and the humidity controlled to within 35 to 55%.

The polarising lens to be sealed must be 100% visually checked to standard to ensure compliance with quality requirements. Lenses which pass this test are put into a cleansing basket for ultra-sonic cleansing.

The formulation of the adhesive used is as follows:

| Principal Ingredient | Solidifier 1 | Solidifier 2 |
| --- | --- | --- |
| 60 | 15 | 1 |

The principal ingredient consists of bisphenol A, epoxy resin, butyl ether

Solidifier 1 consists of polyoxy propylene diamine, triethanolamine

Solidifier 2 consists of diethylamine, propylamine

During the course of development, the following formulations were tried, the proportions being given by weight:

| Glue formula: | | |
| --- | --- | --- |
| | 10:3.3:0.4 | low adhesion |
| | 5:1.5:0.2 | low adhesion |
| | 5:0.5:0.1 | glue too sticky, cannot be cleaned easily |
| | 5:0.5:0.2 | glue too sticky, cannot be cleaned easily |
| | 5:0.8:0.2 | glue 45° C. not level after solidification |
| | 5:1:0.2 | glue 45° C. not level after solidification |
| | 5:1.5:0.6 | poor adhesion |
| | 5:2.5:0.1 | better adhesion, not ideal |
| | 6:1:0.2 | glue cannot be cleaned easily |
| | 6:0.5:0.1 | glue too sticky, cannot be cleaned easily |
| | 6:1.0:0.1 | glue too sticky, cannot be cleaned easily |
| | 6:1.5:0.1 | in depth good adhesiveness ← set as standard |

Polarised lenses produced according to the invention were subjected to humidifier tests at a temperature range of between 58.4° C. and 60° C. and at a humidity range of 21.6~22.7% and 99.8~100.1%, switched every two hours, and yielded the following test results:

| Time Area Apart Reference | 12 hours | 24 hours | 48 hours | Glue Scale | Remarks |
|---|---|---|---|---|---|
| N1 | 30 mm² | 40 mm² | 40 mm² | | |
| N2 | 40 mm² | 45 mm² | 50 mm² | 12:3.0:0.2 | New formula |
| N3 | 24 mm² | 40 mm² | 50 mm² | | |
| K1 | 260 mm² | 280 mm² | 280 mm² | | |
| K2 | 220 mm² | 240 mm² | 240 mm² | 10:3.3:0.4 | KY lens |
| M1 | ✓ | 8 mm² | 8 mm² | | |
| M2 | 150 mm² | 155 mm² | 160 mm² | — | Japanese products |
| M3 | 100 mm² | 120 mm² | 120 mm² | | |
| P1 | 240 mm² | 240 mm² | 240 mm² | | |
| P2 | 240 mm² | 245 mm² | 245 mm² | 10:3.3:0.4 | POLL Lenses. |
| KS 1 | ✓ | ✓ | ✓ | → 12:3.0:0.2 | KY Lenses |
| KS 2 | ✓ | ✓ | ✓ | 12:3.0:0.2 | KY Lenses |
| KS 3 | ✓ | ✓ | ✓ | 12:3.0:0.2 | |

It has thus been found that laminated lenses produced according to the invention are moisture proof and thus do not suffer from de-lamination. They also exhibit enhanced impact resistance. The present invention is applicable to lenses made of glass, resin or other plastics materials.

What is claimed is:

1. A method of sealing lenses which includes the steps of grinding the edges of at least two lenses separately, cleansing the lenses, positioning the lenses next to one another, applying an adhesive comprising an epoxy resin to the ground edges of the lenses prior to a lamination by rotating the lenses near an adhesive applicator such that the adhesive is applied in a bead along the edges, and placing the lenses in an oven to cure the adhesive to produce a laminated, hermetically-sealed lens.

2. The method according to claim 1, wherein a polarising film is applied between the lenses.

3. The method according to claim 1, wherein the lenses are ground to have beveled edges.

4. The method according to claim 1, wherein the lenses are cleansed by being placed in a basket and then subjected to ultra-sonic cleansing.

5. The method according to claim 1, wherein the adhesive is cured in an oven between 40° C. and 50° C. for about 4 hours.

6. The method according to claim 1, wherein the adhesive comprises a principal ingredient including at least one of bisphenol A, epoxy, resin and butyl ether; a first solidifier including at least one of polyoxy propylene diamine and triethanolamine and a second solidifier including at least one of diethylamine and propylamine.

7. A lens produced by the method claimed in claim 1.

8. The method according to claim 2, wherein the lenses are ground to have beveled edges.

9. The method according to claim 2, wherein the adhesive is cured in an oven between 40° C. and 50° C. for about 4 hours.

10. The method according to claim 3, wherein the adhesive is cured in an oven between 40° C. and 50° C. for about 4 hours.

11. The method according to claim 4, wherein the adhesive is cured in an oven between 40° C. and 50° C. for about 4 hours.

12. The method according to claim 2, wherein the adhesive comprises a principal ingredient including at least one of bisphenol A, epoxy, resin and butyl ether; a first solidifier including at least one of polyoxy propylene diamine and triethanolamine and a second solidifier including at least one of diethylamine and propylamine.

13. The method according to claim 3, wherein the adhesive comprises a principal ingredient including at least one of bisphenol A, epoxy, resin and butyl ether; a first solidifier including at least one of polyoxy propylene diamine and triethanolamine and a second solidifier including at least one of diethylamine and propylamine.

14. The method according to claim 5, wherein the adhesive comprises a principal ingredient including at least one of bisphenol A, epoxy, resin and butyl ether; a first solidifier including at least one of polyoxy propylene diamine and triethanolamine and a second solidifier including at least one of diethylamine and propylamine.

15. A lens produced by the method claimed in claim 2.

16. A lens produced by the method claimed in claim 3.

17. A lens produced by the method claimed in claim 4.

18. A lens produced by the method claimed in claim 5.

19. A lens produced by the method claimed in claim 6.

20. A lens produced by the method claimed in claim 8.

* * * * *